United States Patent
Eberle

[15] 3,696,118
[45] Oct. 3, 1972

[54] SPIRO NORBORNANE 6,9-METHANOCYCLOHEPT(B)INDOLES

[72] Inventor: Marcel K. Eberle, 57 Maple Ave., Madison, N.J. 07940

[22] Filed: April 22, 1970

[21] Appl. No.: 33,097

[52] U.S. Cl............260/326.9, 260/251 A, 424/251, 424/274
[51] Int. Cl. .............................................C07d 27/54
[58] Field of Search .................260/326.9, 326.5 B

[56] References Cited

OTHER PUBLICATIONS

Noller, Chemistry of Organic Compounds (1965) pp. 94–95.

Primary Examiner—Alex Mazel
Assistant Examiner—Joseph A. Narcavage
Attorney—Gerald D. Sharkin, Frederick H. Weinfeldt, Robert S. Honor, Walter F. Jewell and Richard E. Vila

[57] ABSTRACT

Spiro-norbornane pyrimido[1,2-a]indoles and aminopropyl-methanocyclohept[b]indoles, e.g., 1',2',3,4-tetrahydro-spiro[norbornane-2,10'(10'aH)-pyrimido[1,2-a]indole]and 5-(3-aminopropyl)-6,9-dihydro-10H-6,9-methanocyclohept[b]indole, are prepared from phenyl pyrazolodines and 2-norbornene-5-carboxaldehyde, and are useful as central nervous system depressants, antidepressants and hypotensive/anti-hypertensive agents.

4 Claims, No Drawings

SPIRO NORBORNANE 6,9-METHANOCYCLOHEPT(B)INDOLES

The invention relates to spiro[5-norbornane-2,10'(10'[1,2-a]indoles] and 5-(3-aminopropyl)-6,9-dihydro-10H-6,9-methanocyclohept[b]indoles, their acid addition salts and processes and intermediates for their preparation.

This invention also relates to 5-(3-aminopropyl)-6,7,8,9-tetrahydro 10H-6,9-methanocyclohept[b]indoles, their acid addition salts, and processes for their preparation.

The indoles of this invention may be represented by the formula

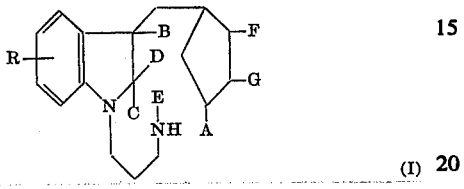

(I)

where
R represents hydrogen; halo having an atomic weight of about 19 to 36; lower alkyl, i.e. alkyl having one to four carbon atoms, e.g., methyl, ethyl, isopropyl and the like or lower alkoxy, i.e., alkoxy having one to four carbon atoms, e.g., methoxy, ethoxy, and the like, and A together with B or C is a carbon to carbon bond and F and G each represents hydrogen or together represent a carbon to carbon bond, provided that when
A and B together represent a carbon to carbon bond,
C and E together represent a carbon to carbon bond and
D represents hydrogen, or when
A and C together represent a carbon to carbon bond
B and D together represent a carbon to carbon bond and
E represents hydrogen.

The compounds contemplated in this invention comprise the indoles selected from the group consisting of:

i. 5-(3-aminopropyl)-6,7,8,9-tetrahydro-10H-6,9-methanocyclohept[b]indoles

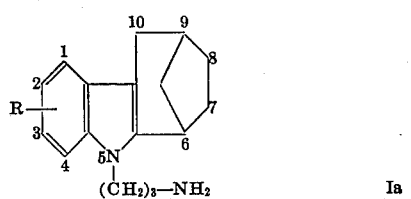

Ia ii. 5-(3-aminopropyl)-6,9-dihydro-10H-6,9-methanocyclohept[b]indoles

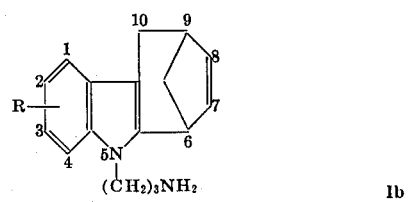

Ib iii. 1', 2', 3', 4'-tetrahydro-spiro[5-norbornane-2,10'(10'aH)-pyrimido[1,2-a]indoles]

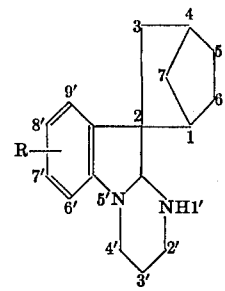

Ic and iv. 1', 2', 3', 4'-tetrahydro-spiro[5-norbornene-2,10'(10'aH)-pyrimido[1,2-a]indoles]

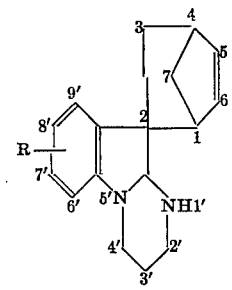

Id where R is as defined above,
or a pharmaceutically acceptable acid addition salt of the compounds (i), (ii) or (iii).

The compounds of Formula (I) in which A and C together represent a carbon to carbon bond, B and D together represent a carbon to carbon bond, and E, F and G are hydrogen are prepared in accordance with the following general reaction scheme:

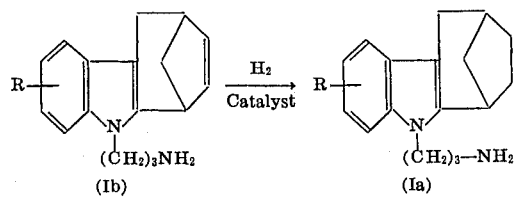

where R is as defined above.

The compounds of Formula (Ia) in either their base form or in the form of an acid addition salt are prepared by reducing the corresponding base form or acid addition form of the compounds of Formula (Ib) with hydrogen in the presence of hydrogenation catalyst in an inert solvent. The hydrogenation catalyst is preferably a platinum or palladium catalyst, in particular platinum oxide. The inert solvents preferred are the lower alcohols, especially methanol, ethanol, or isopropyl alcohol and the aromatic solvents, particularly benzene and toluene. The temperature of the reaction and the pressure of the hydrogen are not critical in the hydrogenation. The process is normally carried out at a temperature of about 0° to 50° C., and preferably at room temperature. The hydrogenation is carried out generally at a pressure which may vary from about 14 psi (about 1 atmosphere) to about 50 psi. The product is recovered by conventional techniques, e.g., by precipitation.

The compounds of Formula (Ib) in the form of an acid addition salt are prepared in accordance with the following reaction scheme:

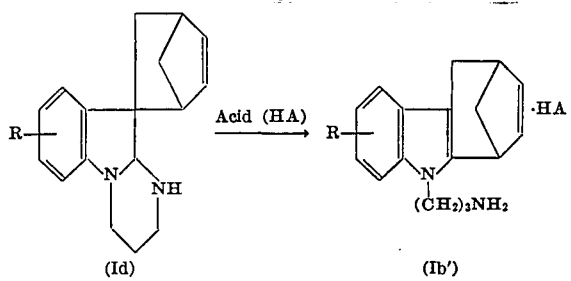

(Id)       (Ib')

where
R is as defined above, and
HA is an acid addition salt forming acid

The compound of Formula (Ib') is prepared by treating a compound of Formula (Id) with an acid (HA). The exact nature of the acid used is not critical and any of the conventional inorganic or organic acids preferably those which form pharmaceutically acceptable acid addition salts can be used. Especially preferred acids are the weaker organic acids such as succinnic acid, maleic acid, fumaric acid, tartaric acid, malonic acid, and the like. The reaction may be run in excess reagent, or a solvent, preferably benzene, toluene, or the lower alkanols, e.g., methanol, ethanol, and the like, may be used. The reaction temperature is not critical but the reaction is preferably carried out at temperatures between about 20° c. to about 35° C., more preferably at room temperature. The product (Ib') is recovered by conventional techniques, e.g., evaporation or precipitation.

The compounds of Formula (Ia) and (Ib) in their acid addition salt form can be converted to their corresponding base form by conventional techniques, e.g., by treatment of the salt with a base such as sodium carbonate in a suitable solvent. The compound of Formula (Ia) and (Ib) can then be recovered by conventional techniques, e.g., evaporation or precipitation.

The compounds of Formula (I) in which A and B together are a carbon to carbon bond, C and E together are a carbon to carbon bond, D represents hydrogen and F and G together represent a carbon to carbon bond (compounds Id), are prepared in accordance with the following reaction scheme:

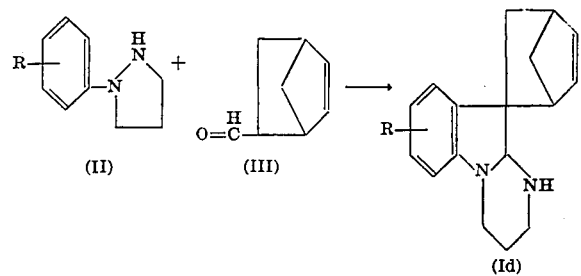

(II)     (III)     (Id)

where R is as set out above.

The compounds of Formula (Id) are prepared by treating a compound of Formula (II) with 2-norbornene-5-carboxaldehyde (III). Although not critical, it is preferred that the reaction be run in the presence of an inert gas, e.g., nitrogen, argon, helium and the like. The reaction may be carried out in excess aldehyde (III) but an inert solvent, in particular, aromatic, hydrocarbons, e.g., benzene or toluene, or a lower alkanol such as methanol or ethanol, is preferred. Although the temperature of the reaction is not critical, the reaction is preferably carried out at temperature between about 50° C. to about 150° C., and more preferably at the reflux temperature of the system. For optimun results, the reaction is run for a period of about 30 minutes to about 24 hours. The product is obtained by conventional techniques, e.g., evaporation.

The compounds of Formula (Ic) are prepared in accordance with the following reaction scheme:

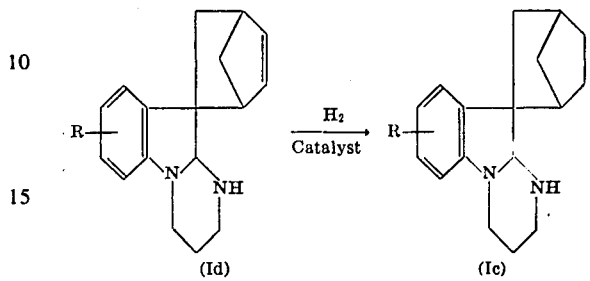

(Id)       (Ic)

where R is as defined above

The compounds of Formula (Ic) are prepared by reducing the compound of Formula (Id) with hydrogen in the presence of a hydrogenation catalyst in an inert solvent. The hydrogenation catalyst is preferably a platinum or palladium catalyst, especially 10 percent palladium or carbon. The inert solvents preferred are the lower alcohols, especially methanol, ethanol, or isopropyl alcohol; and the aromatic hydrocarbons, particularly benzene and toluene. The temperature of the reaction and the pressure of the hydrogen are not critical in the hydrogenation. The process is normally carried out at a temperature of about 0° to 50° C., and preferably at room temperature. The hydrogenation is carried out generally at pressures which vary from about 14 psi (about 1 atmosphere) to about 50 psi. The product is recovered by conventional techniques, e.g., by precipitation.

The compound of Formula III, 2-norbornene-5-carboxaldehyde, and many of the compounds of Formula II are known and are prepared according to methods disclosed in the literature. The compounds of Formula II which are not known can be prepared by analogous methods from known materials The compounds of Formulae (Ia), (Ib), and (Ic) are useful because they possess pharmacological activity in animals. In particular, the compounds of Formulae (Ia) and (Ib) are useful as central nervous system depressants as indicated by their activity in mice tested according to the 30 word adjective check sheet basically as described by Irwin S. (Gordon Research Conference, Medical Chemistry 1959) and Chen. (Symposium or Sedative and Hypnotic Drugs, William and Wilkins 1954). The compounds of Formula (Ic) are useful as antidepressants as indicated by their ability to reverse reserpine hypothermia in mice tested essentially in accordance with the method of Spencer, P.S.J. (Antagonism of Hypothermia in the Mouse by Antidepressants, Antidepressant Drugs, p. 194–204, Eds. S Garattini and M.N.G. Dukes, Excerpta Medica Foundation, 1967).

In addition, the compounds of Formulae (Ib) and (Ic) are useful as hypotensive/antihypertensive agents, as indicated by their activity in anesthetized dogs using a modification of the method described by Markowitz (Exper. Surgery, Williams and Wilkins, 2nd Ed., 1949) in which blood pressure is measured with a mercury manometer or transducer via a catheter inserted in either the carotid or femoral artery of the animal.

When so utilized, the compounds of Formulae (Ia), (Ib) and (Ic) may be combined with one or more pharmaceutically acceptable carriers or adjuvants. They may be administered orally or parenterally and, depending upon the compound employed and the mode of administration, the exact dosage utilized may vary.

Furthermore, the compounds of Formula (Ia), (Ib) and (Ic) may be similarly administered in the form of their non-toxic pharmaceutically acceptable acid addition salts. Such salts possess the same order of activity as the free base, are readily prepared from the base by reacting it with an appropriate acid and accordingly, are included within the scope of the invention. Representative of such salts are the mineral acid salts, such as the hydrochloride, hydrobromide, sulfate, phosphate and the like and the organic salts, such as the succinate, maleate, malonate, tartrate, fumarate, benzoate, acetate, p-toluenesulfonate, benzenesulfonate, and the like.

In general, satisfactory results are obtained with the compounds of Formula (Ia) and (Ib), are administered as central nervous system depressants at a daily dosage of about 10 milligrams to about 100 milligrams per kilogram of animal body weight. This daily dosage is preferably administered 2 to 4 times a day, or in sustained release form. For most large mammals, such as primates, the total daily dosage is from about 700 milligrams to about 2,000 milligrams. Dosage forms suitable for internal use comprise from about 175 milligrams to about 1,000 milligrams of the active compound in intimate admixture with a solid or liquid pharmaceutically acceptably carrier or diluent.

When the compounds of Formula (Ic) are used as anti-depressant agents, satisfactory results are obtained at a daily dosage of about 3 milligrams to about 100 milligrams per kilogram of animal body weight. This daily dosage is preferably administered 2 to 4 times a day, or in sustained release form. For most large mammals, such as primates, the total daily dosage is from about 200 milligrams to about 1,500 milligrams. Dosage forms suitable for internal use comprise from about 50 milligrams to about 750 milligrams of the active compound in intimate admixture with a solid or liquid pharmaceutically acceptably carrier or diluent.

When the compounds of Formula (Ia) and (Ib) are used as hypotensive/antihypotensive agents, satisfactory results are obtained at a daily dosage of about 4 milligrams to about 100 milligrams per kilogram of animal body weight. This daily dosage is preferably administered 2 to 4 times a day, or in sustained release form. For most large animals, such as primates, the total daily dosage is from about 300 milligrams to 2,000 milligrams. Dosage forms suitable for internal use comprise from about 75 milligrams to about 1000 milligrams of the active compound in intimate admixture with a solid or liquid pharmaceutically acceptable carrier or diluent.

A representative formulation suitable for oral administration is a capsule prepared by standard encapsulating techniques which contains the following:

| Ingredients | Parts by Weight |
|---|---|
| 5-(3-aminopropyl)-6,9-dihydro-10H-6,9-methano-cyclohept[b]indole | 200 |
| Inert filler (starch, lactose, kaolin, etc.) | 200 |

EXAMPLE 1

1',2',3',4'-tetrahydro-spiro[5-norbornene-2,10'(10'aH)-pyrimido[1,2-a]indole]

Into a flask equipped with a reflux condenser and Dean-Stark tube, 7.4 g of phenylpyrazolidine, 6.1 g of 2-norbornene-5-carboxaldehyde and 80 ml of toluene are charged under nitrogen. The reactants are refluxed overnight under nitrogen and water was separated out into the Dean-Stark tube. The solvent is removed by evaporation and the product, 1',2',3',4'-tetrahydro-spiro[5-norbornene-2,10'(10'aH)-pyrimido[1,2-a]indole] is obtained.

When p-chlorophenylpyrazolidine, p-tolylpyrazolidine or p-methoxyphenylpyrazolidine is used in place of phenylpyrazolidine in the process of this example, there is obtained 8'-chloro-1',2',3',4'-tetrahydro-spiro[5-norbornene-2,10'(10'aH)-pyrimido[1,2-a]indole], 8'-methyl-1',2',3'4'-tetrahydro-spiro[5-norbornene-2,10'(10'aH)-pyrimido[1,2-a]indole], or 8'-methoxy-1',2',3',4'-spiro[5-norbornene-2,10'aH)-pyrimido[1,2-a]indole], respectively.

EXAMPLE 2

1',2',3',4'-tetrahydro-spiro[norbornane-2,10'(10'aH)-pyrimido[1,2-a]indole]maleate The 1',2',3',4'-tetrahydro-spiro[5-norbornene-2,10'(10'aH)-pyrimido[1,2-a]indole] of example 1 is dissolved in 100 ml. of absolute ethanol which is charged into a Parr type hydrogenator containing 500 mg. of 10 percent palladium on carbon. Hydrogen is added and the reactants are agitated until the uptake of hydrogen ceases. The catalyst is then removed by filtration and most of the solvent is removed by evaporation. To the residue, 6.0 g. of maleic acid are added; and the product, 1',2',3',4'-tetrahydro-spiro-[norbornane-2,10'(10'aH)-pyrimido[1,2-a]indole]maleate (m.p. 173°–174° C.) is precipitated by addition of ether and separated by filtration.

When 8'-chloro-1',2',3',4'-tetrahydro-spiro[5-norbornene-2,10'(10'aH) pyrimido[1,2-a]indole]; 8'-methyl-1',2',3',4'-tetrahydro spiro [5-norbornane-2,10'(10'aH)pyrimido[1,2-a]indole]; or 8'-methoxy-1',2',3',4'-tetrahydro spiro[5-norbornene-2,10'(10'aH) pyrimido[1,2-ad]indole]is used in place of 1',2',3',4'-tetrahydro-spiro[5-norbornene-2,10'(10'aH) pyrimido[1,2-a]indole]in the process of this example, there is obtained 8'-chloro-1',2',3',4'-tetrahydro-spiro[norbornane-2,10'(10'aH)-pyrimido [1,2-a]indole]maleate; 8'-methyl-1',2',3',4'-tetrahydro-spiro[norbornane-2,10'(10'aH) pyrimido[1,2-a]indole]maleate; 8'-methoxy-1',2',3',4'-tetrahydro-spiro[norbornane-2,10'aH) pyrimido[10'aH)pyrimido [1,2-a]indole]maleate, respectively.

EXAMPLE 3

5-(3-aminopropyl)-6,9-dihydro-10H-6,9-methano-cyclohept[b]indole maleate

Into a flask equipped with a reflux condenser and Dean-Stark tube 7.4 g of phenylpyrazolidine, 6.1 g of 2-norbornene-5-carboxal-dehyde and 80 ml of toluene are charged under nitrogen. The reactants refluxed for one and a half hours under nitrogen to separate the water out into the Dean-Stark tube. The solution is then cooled and 6.0 g. of maleic acid in 20 ml of methanol is added with stirring. The product, 5-(3-amino-propyl)6,9-dihydro-10H-6,9-methano-cyclohept[b]indole maleate (m.p. 165°–166° C.) precipitates and is collected by filtration. Additional product is precipitated by the addition of ether.

When p-chlorophenylpyrazolidine, p-tolyl-pyrazolidine, or p-methoxy-phenylpyrazolidine is used in place of phenylpyrazolidine in the process of this example, there is obtained, 5-(3-aminopropyl)-2-chloro-6,9-dihydro-10H-6,9-methanocyclohept[b]indole maleate; 5-(3-aminopropyl)-2-methyl-6,9-di-hydro-10H-6,9-methanocyclohept[b]indole maleate or 5-(3-aminopropyl)-2-methoxy-6,9-dihydro-10H-6,9-methanocyclohept[b]findole maleate, respectively.

EXAMPLE 4

5-(3-aminopropyl)-6,7,8,9-tetrahydro-10H-6,9-methanocyclohept[b]indole succinate Into a Parr type hydrogenator containing 500 mg of platinum oxide, 5.0 g of 5-(3-aminopropyl)-6,9-dihydro-10H-6,9-methanocyclohept[b]indole maleate in 150 ml of ethanol is charged, and hydrogen is added. The reactants are agitated until the uptake of hydrogen ceases. In this case, both the 7,8-double bond of the base and the double bond of the acid is reduced. When hydrogenation is complete, the catalyst is removed by filtration and ether is added to precipitate the product, 5-(3-aminopropyl)-6,7,8,9-tetrahydro-10H-6,9-methanocyclohept[b]indole succinate (m.p. 153°C.).

When 5-(3-aminopropyl)-2-chloro-6,9-dihydro-10H-6,9-methanocyclo-hept[b]indole maleate; 5-(3-aminopropyl)-2-methyl-6,9-dihydro-10H-6,9-methanocyclohept[b]findole maleate or 5-(3-aminopropyl)-2-methoxy-6,9-dihydro-10H-6,9-methanocyclohept[b]findole maleate is used in place of 5-(3-aminopropyl) -6,9-dihydro-10H-6,9-methano-cyclohept[b]indole maleate in this example, there is obtained 5-(3-aminopropyl) -2-chloro-6,7,8,9-tetrahydro-10H-6,9-methanocyclohept[b]indole succinate, 5-(3-aminopropyl)-2-methyl-6,7,8,9-tetrahydro-10H-6,9-methanocyclohept[b]indole succinate or 5-(3-aminopropyl)-2-methoxy-6,7,8,9-tetrahydro-10H-6,9-methanocyclohept[b]indole succinate, respectively.

The succinate salt of 5-(3-aminopropyl)-6,7,8,9-tetrahydro-10H-6,9-methanocyclohept[b]indole is dissolved in ethanol and sodium carbonate is added. Sodium succinate precipitates and is removed by filtration. The free base, 5-(3-aminopropyl)-6,7,8,9-tetrahydro-10H-6,9-methanocyclohept[b]indole (m.P. 156°–158° C.) is recovered by evaporation.

When the free base is dissolved in ethanol and treated with hydrochloric acid or maleic acid, 5-(3-aminopropyl)-6,7,8,9-tetrahydro-10H-6,9-methano-cyclohept[b]indole hydrochloride (m.p. 305°–309° C.) or 5-(3-aminopropyl)-6,7,8,9-tetrahydro-10H-6,9-methanocyclohept[b]indole maleate (m.p. 163°–165° C.), respectively, is obtained.

What is claimed is:

1. A compound of the formula:

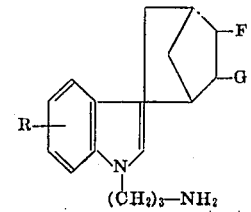

wherein R represents hydrogen, halo having an atomic weight of about 19 to 36, lower alkyl or lower alkoxy; and F and G each represent hydrogen or together represent a carbon to carbon bond; or a pharmaceutically acceptable acid addition salt thereof.

2. The compound of claim 1 which is 5-(3-aminopropyl)-6,7,8,9-tetrahydro-10H-6,9-methano-cyclohept[b]indole.

3. The compound of claim 1 which is 5-(3-aminopropyl)-6,9-dihydro-10H-6,9-methano-cyclohept[b]indole.

4. A process for preparing a compound of claim 1 wherein F and G together represent a carbon to carbon bond in acid addition salt form which comprises treating a compound of the formula

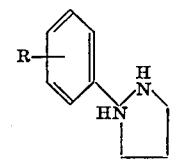

where R is as defined in claim 1, with 5-norbornene-2-carboxaldehyde to obtain an indole of the formula

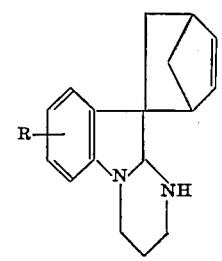

and thereafter treating said indole with an acid addition salt forming acid.

* * * * *

UNITED STATES PATENT OFFICE
CERTIFICATE OF CORRECTION

Patent No. 3,696,118      Dated October 3, 1972

Inventor(s) Marcel K. Eberle

It is certified that error appears in the above-identified patent and that said Letters Patent are hereby corrected as shown below:

In the title - delete the "B" and insert a --b--.

Abstract - line 3 - the "3" should be a --3'--.

Column 1 line 3 - insert a --'-- after the number 10.

Column 1 line 4 - delete " '(10' " and insert --(10'aH) pyrimido --.

Column 4 line 28 - insert a period after the word toluene.

Signed and Sealed this thirteenth Day of January 1976

[SEAL]

Attest:

RUTH C. MASON
*Attesting Officer*

C. MARSHALL DANN
*Commissioner of Patents and Trademarks*